Nov. 11, 1969   J. C. JANACEK   3,478,210
EXTENDED RANGE INFRARED MOISTURE GAGE STANDARDS
Filed Aug. 23, 1967

Inventor
Jerry C. Janacek
By Ralph H. Hohnfeldt
Attorney

United States Patent Office 3,478,210
Patented Nov. 11, 1969

3,478,210
EXTENDED RANGE INFRARED MOISTURE GAGE STANDARDS
Jerry C. Janacek, Milwaukee, Wis., assignor to General Electric Company, a corporation of New York
Filed Aug. 23, 1967, Ser. No. 662,660
Int. Cl. H01j *39/00;* G01t *1/16*
U.S. Cl. 250—83     4 Claims

ABSTRACT OF THE DISCLOSURE

A standard is provided for calibrating gages that measure water content in paper by sensing variations in reflected or transmitted infrared radiation. The standard simulates paper with high water content and is made by mixing certain hydrated salts in a silicone compound and molding the mixture into a pellet. Thin pellets are sealed between glass windows and used as transmission gage standards and thicker pellets are used with reflection gages.

BACKGROUND OF THE INVENTION

This invention relates to a standard for calibrating gages that continuously monitor the water content of paper web during manufacture in response to variations in the absorption of infrared radiation. The standard is adapted to be substituted for the paper in the infrared gage and to represent a predetermined percentage of water with respect to paper fiber. With the standard in place, the gage may be adjusted until it indicates a percentage of water corresponding with the rating of the standard.

There are two basic types of infrared moisture gages. The first type detects absorption differences in a given wavelength band of infrared radiation that is reflected from the paper. The second type detects variations in the absorption of a given wavelength band of infrared radiation that is transmitted through the paper. A commercial form of an infrared reflection gage is described in U.S. Patent No. 3,150,264, dated Sept. 22, 1964, which is in the name of R. C. Ehlert and is assigned to the assignees of the instant invention. A gage that depends on infrared transmission is described in U.S. Patent No. 3,228,282 dated Jan. 11, 1966. When either type of gage is used on-the-line, as in the paper industry, it is desirable that gage precision be checked periodically. An early method of checking precision was to sever a sample from the sheet and bring it to the laboratory where the difference between its wet and dehydrated weights were determined. Any discrepancy between the amount of water indicated by the weight difference and the amount of water indicated by the gage was then corrected by adjusting the gage. This procedure is inaccurate, however, because the moisture content in paper changes rapidly in the atmosphere during a test. Even if the discrepancy between the gage reading and actual moisture was accurately determined, it was not possible to make a timely gage correction because several thousand feet of paper would have traversed the papermaking machine during the testing interval.

To overcome these handicaps, R. C. Ehlert in U.S. Patent 3,205,355, dated Sept. 7, 1965, proposed moisture gage standards that could be placed in the gage to simulate a known percentage of water in paper. These standards used hydrated salts or chemicals that included a hydroxyl radical in suitable binders. The composition is pressed into a pellet and retained in a sealed container with windows for either transmitting radiation all the way through the pellet or reflecting infrared radiation from one side through one window. The standards worked successfully with gages that were located at the relatively dry end of the paper machine where moisture content is in the range of 5 to 15%.

Paper manufacturers now want to apply infrared moisture gages to the wet end of the papermaking machinery where the moisture content is as high as 50%. This requires standards that coincide with the paper moisture level that is to be measured. Ehlert Patent No. 3,205,355 suggests that salts with high water of hydration would serve this purpose. It was demonstrated that magnesium sulphate with six molecules of water of hydration and magnesium nitrate with seven molecules of water of hydration simulated kraft paper with a moisture content of approximately 40% where the weight of the paper was 40 pounds per 3,300 square feet. The standards were prepared my mixing the two chemicals and pressing them into pellets. The pellets were then encased in watertight containers with infrared transmissive windows as taught by Ehlert. These high moisture standards exhibited poor stability, however, when they were subjected to the widely varying temperatures that are encountered in practice. Their physical appearance and infrared reflectance characteristics underwent large changes for relatively small temperature changes. The pellets puffed up, developed cracks, and rough surfaces and exhibited color changes. Any such changes, of course, prohibited use of the pellets as standards. The behavior of these materials led to speculation that the problem was related to free water being pressed into or retained with the saturated salts. The free water is believed to be highly mobile and subject to thermal motion that upsets the stability of the pellet.

It seemed logical that if the water of hydration could be retained and the free water, if any, could be driven off, the chemicals could mix in a suitable inert encapsulating material and stability would result. Unfortunately, however, in high range standards, it was found that inert encapsulating materials resulted in unpredictable and drastically altered infrared reflectance and transmission characteristics with the highly hydrated salts that were tried.

SUMMARY OF THE INVENTION

The present invention constitutes a solution to the problems outlined above and results in a simulated high moisture content standard with stable physical properties. The invention results from perceiving that both the water of hydration of the compounds and the mobile or adsorbed water had to be held at fixed levels and in a stable state in the final standards. A unique solution was found in mixing the hydrated salts with a room temperature curing organopolysiloxane or silicone compound after suitable processing of the chemicals. The true reasons for the surprisingly good stability are uncertain, but it is postulated that when the compounds in a predetermined state of dryness are mixed with the silicone, that a chemically controlled amount of water is yielded by the silicone to the chemicals in the curing process. This physical or chemical bonding between the water in the silicone and the compounds is believed to occur in definite proportions which persist after curing.

From the foregoing discussion, it is evident that a basic object of this invention is to provide for use with infrared reflection or transmission moisture gages standards that are inherently stable in any temperature range to which they may be subjected in the unfavorable environment that prevails in the paper mill.

Further objects are to provide moisture gage standards that are easy to fabricate, that will be of uniform quality, that are rugged and unaffected by physical handling and, indeed, that make the use of high moisture range infrared gages possible in the paper industry.

DESCRIPTION OF THE PREFERRED EMBODIMENT

Figure 1:
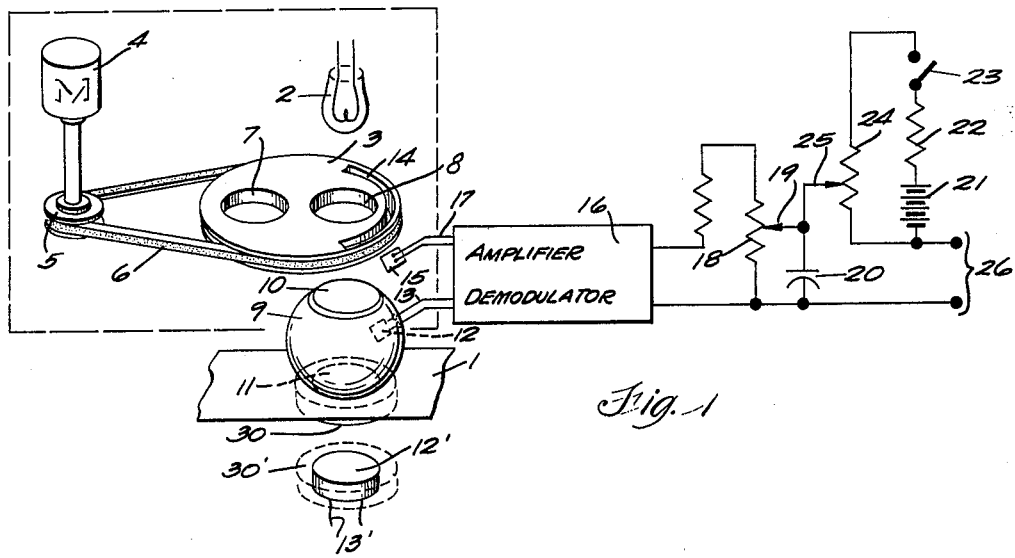
FIGURE 1 is a schematic diagram of a typical infrared moisture gage with which the new standards may be used.

In FIGURE 1 a moving sheet of paper whose moisture content is to be measured is given the reference numeral 1. Remotely above the sheet 1 is an incandescent lamp 2 which projects a beam of radiation downwardly toward the paper. The beam is polychromatic radiation which includes both visible and infrared wavelength bands. Beneath lamp 2 is a rotatable filter-supporting wheel 3 which is rotated by a motor 4 by means of a pulley 5 and a belt 6. Filter wheel 3 has two band pass filters 7 and 8 inserted therein and these filters are adapted to orbit around the center of rotation of the wheel. One filter 7 transmits an infrared wavelength that is absorbed in proportion to the water content of the paper. the other filter 8 is relatively unaffected by the water or paper and serves as a reference wavelength to compensate for fluctuations in paper distance and other factors.

The radiation pulses transmitted through filters 7 and 8 impinge on paper 1 and, in one form of gage, reflect back to an integrating sphere 9. The sphere has suitable top and bottom openings 10 and 11 for passing the radiation to the paper. Radiation that is reflected from paper 1 undergoes multiple reflections inside of integrating sphere 9 and is detected by a suitable photocell 12 which is mounted in the wall of the sphere. Thus, consecutive voltage pulses appear on conductors 13 leading from photocell 12 and these pulses are alternately representative of the intensities of the wavelength that is affected by changes in water content and the wavelength that is unaffected and serves as a reference. Filter wheel 3 has a slot 14 through which pulses of radiation from lamp 2 may pass and impinge on another photocell detector 15. Photocell 15 produces phase reference voltage pulses that are used to demodulate the voltage signals from photocell 12. The signals so produced are fed into an amplifier-demodulator 16 through conductors 17. For present purposes, it is sufficient to note that amplifier-demodulator 16 produces a voltage signal on a voltage-divider resistor 18 that varies in correspondence with the amount of water in the paper. Anyone interested in the details of this type of gage may refer to Patent No 3,150,264 of Ehlert.

The gage shown in FIGURE 1 may easily be converted to a transmission type as suggested in this figure. This involves eliminating integrating sphere 9 and locating a detector 12' beneath paper sheet 1 so that transmitted infrared radiation is modulated by the water in the paper. The principles of operation of the transmission gage are essentially the same as for the reflection gage described above, except that leads 13' are fed into amplifier-demodulator 16 in place of leads 13. In a certain commercial reflection gage, filter 7 is adapted to pass 1.94 micron infrared radiation because that wavelength coincides with one high absorption band for water and paper. The reference filter 8 is adapted to pass 1.80 micron infrared radiation. In either a transmission or reflection gage, the filters are chosen so that one wavelength is heavily absorbed by the medium which is being measured and the other is unaffected.

The integrated D-C output signal voltage, which represents percentage of water, is applied to dividing resistance 18 that has an adjustable contact 19 and a smoothing capacitor 20. The position of contact 19 determines the slope of the calibration line of the gage. That is, its adjustment affects the slope of the line on a graph that represents the relation between output voltage and percent moisture in the paper.

Means are also provided for establishing the initial or zero point of the gage output. These means include a D-C source 21 in series with a limiting resistor 22, a switch 23, and a potentiometer 24 on which there is an adjustable arm 25. One may see that the position of contact arm 25 determines the amount of voltage that opposes the voltage derived from potentiometer 18, so that a zero point or zero moisture condition may be preset. The net output signal that is indicative of the amount of water in the paper appears on terminals 26 which may be connected to a direct reading meter, a recorder, or other electro-responsive devices, not shown. The zero and slope adjustments described in this and the preceding paragraph are merely illustrative for the same results can be obtained by other means.

To calibrate the reflection type gage shown in FIGURE 1, a standard holder, which is shown in outline in this figure and identified by the reference numeral 30, is fastened onto the bottom of the integrating sphere 9 to intercept and reflect radiation that would normally be directed to and reflected from paper sheet 1. In practice, one standard representing zero or low water content is posiitoned and the gage is adjusted to indicate zero or some other low initial value. This produces one point on the calibration curve. Then the new high standard is positioned and the slope control is adjusted until the high indication agrees with the corresponding point on the calibration line. Following adjustment of the zero and slope controls 19 and 25, the gage is restored to normal operation after removal of the standard. The same procedure is used with a transmission gage except the standard holder 30' is fastened to detector 12' which is beneath the paper and the paper is removed during standardizing.

Figures 2, 3, 4:
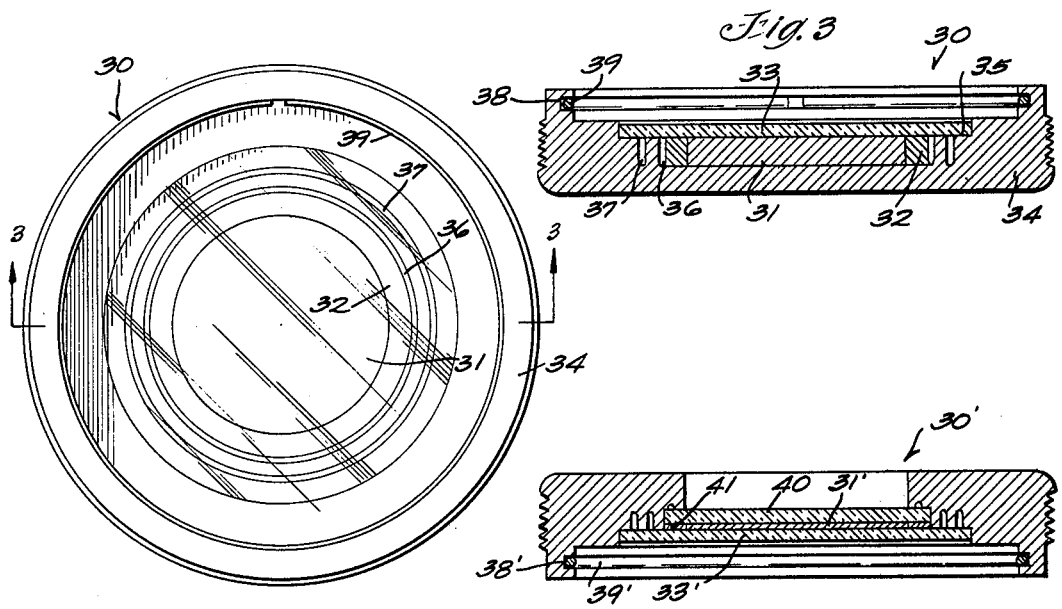
FIGURE 2 is a top plan view of a type of the new standard which is adapted for use with a reflection type gage.
FIGURE 3 is a vertical section taken on a line corresponding with 3—3 in FIGURE 2; and, FIGURE 4 is a vertical cross-section of a standard that is adapted for use with transmission type gage.

In FIGURES 2 and 3 which show a standard that is suitable for use with a reflection type gage, a pellet or wafer of the new material that simulates all the properties of paper with high water content is designated by the reference numeral 31. Before describing the mechanical details of the standard holder 30, an illustrative composition of the material 31 will be described for a standard that is adapted for simulating about 40% water, in a gage of a certain sensitivity, kraft paper that has a basis weight of 40 pounds per 3,300 square feet.

As suggested above, the new standard material comprises a mixture of hydrated salts and room temperature curable (or curing) silicone. A suitable silicone of this type is one that is prepared in substantially the manner of Example No. 1 in U.S. Patent No. 2,843,555, dated July 15, 1958, and assigned to the assignee of the instant invention. The silicone compound described in the patent is sold for general purposes by the assignee under the trade designation "RTV–11" and this is a two-package type which requires a small amount of a catalyst or curing agent to make it vulcanize or set.

The composition of the 40% moisture content standard is as follows:

49.75% by weight of RTV–11 fluid
0.25% by weight of curing agent
12.00% by weight of magnesium nitrate ($Mg(NO_3)_2 \cdot 7H_2O$)
38.00% by weight of magnesium sulphate ($MgSO_4 \cdot 6H_2O$)

The two salts are separately ground, sifted through a No. 50 (U.S. Standard) sieve and then combined. The salt mixture is then dehydrated by baking at 140° F. for 80 minutes. This expels much of the adsorbed water and, very likely, some of the water of hydration as well. The salt mixture is then reground for a few minutes and combined with the equal amount by weight of RTV–11 and after being thoroughly stirred, the curing agent is added. Then the standard in a solid or cured state pellets are formed by pouring the mixture into a suitable metal molding ring adhered to a glass plate and allowed to cure for twenty-four hours although a lesser time would be permissible as indicated in Patent No. 2,843,555.

Before the hydrated salts are added to the silicone, it is uncertain as to what their individual water of hydration may be. Chemical handbooks point out that magnesium nitrate usually has two to six molecules of water of hydration and that five of the six are lost at 626° F. Magnesium sulphate has typically one to seven molecules of water of hydration and loses six at 302° F. Since, in the above example, the salts are only heated to 140° F. it is probable that there are some intermediate number of molecules of water of hydration in each of the compounds. It is also likely that most of the adsorbed water is driven off in the dry atmosphere of the oven in which the compounds are held at 140° F. for more than a hour. It is imperative that the chemicals be reground for a few minutes after removal from the oven and mixed with the silicone without delay.

The RTV-11 silicone yields water to its environment during curing. It is conjectured then, that the salts have an affinity for a definite number of molecules of water of hydration which are obtainable from the silicone and that a stable equilibrium condition results. The molded pellets are quite stable even in the open atmosphere, but they are placed in containers to avoid surface contamination and physical damage.

A standard having slightly higher water content indication or somewhat lower water content indication may be made by adjusting the total amount of hydrated salt or by varying one or the other or by combining several salts. In the standard described in detail above, either the hydrated nitrate or sulphate of magnesium could have been used alone to simulate a certain water content at the measuring wavelength but it was discovered that by adjusting the proportions of the salts that a more exact simulation was obtained for all the properties of water and a particular paper across that part of the infrared spectrum which included the reference wavelength and the moisture sensitive wavelength. This suggests that gages of either transmission or reflectance types which operate in other parts of the infrared spectrum, where there are high absorption peaks, may require experimentation with the proportions and choice of the hydrated salts to obtain exact duplication of all the properties of paper. The silicone is penetrated reasonably well by infrared radiation banks that are absorbed by water so that even if less salt is dispersed in the mixture, greater penetration results in more absorption of the underlying particles of the compounds. Hence, there is not necessarily a direct proportionality between the amount of the compounds and absorbed radiation and some experimentation will necessarily be required of the fabricator. Standards for different moisture ranges may be made using the various hydrated salts suggested in Ehlert's Patent 3,205,355.

Refer now to FIGURES 2 and 3 for a further description of the construction of the standard holder 30. As indicated above, the silicone and salt standard material 31 is molded in a metal ring 32 which is placed on top of a glass plate 33 during the molding process. During molding, of course, ring 32 is on top and glass plate 33 is on the bottom so that the fluid composition 31 can be poured into the interior of the ring until it is level with the edges. The inverted ring 32 with the glass plate 33 on top is set in a metal body 34 which is provided with a suitable annular shouldered recess 35. The interface between shoulder 35 and the edge of plate 33 is secured and sealed with a water-proof epoxy resin or other flexible adhesive. A small annular free space 36 formed around ring 32 and another annular groove 37 are for the purpose of capturing any surplus adhesive.

The metal body 34 has an internal annular groove 38 near its top in which there is a snap ring 39 for effecting a compression fit between the body 34 and the bottom of the integrating sphere in FIGURE 1, for example. This enables quick attachment and detachment of the standard from the gage during the standardizing procedure.

A suitable standard for a transmission type gage is shown in FIGURE 4 and designated generally by the reference numeral 30'. The construction and materials used in this standard may be essentially the same as those used in the reflection standard which was just described. However, in the transmission standard of FIGURE 4, the pellet of the silicone and hydrated salt mixture 31' is made thin enough to pass infrared radiation at reasonably high intensity by interposing the standard material 31' between two glass plates 33' and 40. The glass plates are separated by a thin ring 41 which governs the thickness of the infrared absorbing mixture 31'. For a transmission type gage having the same sensitivity as the reflection gage described in Ehlert Patent 3,150,264, it was found that adequate infrared intensities were transmitted when layer 31' had a thickness in the range of 0.050 to 0.075 inch.

Although embodiments of a new high moisture content standard have been described which involve combining hydrated salts with a room temperature curing organopolysiloxane, it is to be understood that such description is intended to be illustrative rather than limiting, for the invention may be variously embodied and is to be limited only by interpretation of the claims which follow.

I claim:
1. A standard for checking the precision of a gage that measures water content in paper by detecting variations in the intensity of infrared radiation that is either transmitted or reflected by wet paper, said standard comprising:
 (a) a mixture of hydrated salt and room temperature curable organopolysiloxane, the latter of which is in a solid state, and
 (b) a sealed container embodying the cured mixture and including transparent window means that transmits infrared radiation to and from the mixture.
2. The invention set forth in claim 1 wherein:
 (a) said hydrated salt constitutes a mixture of magnesium sulphate and magnesium nitrate.
3. The invention set forth in claim 1 wherein:
 (a) said mixture of said organopolysiloxane and said hydrated salt comprises substantially 12% by weight of magnesium nitrate, substantially 38% by weight of magnesium sulphate and substantially 50% by weight of the organopolysiloxane.
4. The invention set forth in claim 1 wherein:
 (a) said salt comprises magnesium nitrate and magnesium sulphate originally having, respectively, seven and six molecules of water of hydration prior to dehydration.

References Cited
UNITED STATES PATENTS
3,205,355  9/1965  Ehlert _____ 250—83

RALPH G. NILSON, Primary Examiner

D. L. WILLIS, Assistant Examiner

U.S. Cl. X.R.
250—83.3